United States Patent [19]

Schaffitz

[11] Patent Number: 4,712,528
[45] Date of Patent: Dec. 15, 1987

[54] FUEL INJECTION SYSTEM

[75] Inventor: Wolfgang Schaffitz, Munich, Fed. Rep. of Germany

[73] Assignee: Institut für Motorenbau Professor Huber e.V., Munich, Fed. Rep. of Germany

[21] Appl. No.: 352,918

[22] Filed: Feb. 26, 1982

Related U.S. Application Data

[63] Continuation of Ser. No. 122,951, Feb. 20, 1980, abandoned.

[30] Foreign Application Priority Data

| Feb. 24, 1979 | [DE] | Fed. Rep. of Germany | 2907279 |
| Mar. 9, 1979 | [DE] | Fed. Rep. of Germany | 2909307 |
| Apr. 12, 1979 | [DE] | Fed. Rep. of Germany | 2914966 |
| May 12, 1979 | [DE] | Fed. Rep. of Germany | 2919229 |

[51] Int. Cl.⁴ .................................... F02M 39/00
[52] U.S. Cl. ............................. 123/446; 123/447; 123/497
[58] Field of Search ............. 123/447, 446, 445, 497, 123/499, 357, 458

[56] References Cited

U.S. PATENT DOCUMENTS

| 2,902,018 | 9/1959 | Schlichtenmayer | 123/373 |
| 3,587,547 | 6/1971 | Hussey | 123/446 |
| 3,810,453 | 5/1974 | Wolfe | 123/447 |
| 3,822,677 | 7/1974 | Reddy | 123/497 |
| 3,967,598 | 7/1976 | Rachel | 123/497 |
| 4,050,437 | 9/1977 | Hollet | 123/450 |
| 4,069,800 | 11/1978 | Kanda | 123/447 |
| 4,161,161 | 7/1979 | Bastenhof | 123/447 |
| 4,205,648 | 6/1980 | Graham | 123/497 |
| 4,440,132 | 4/1984 | Terada | 123/446 |

Primary Examiner—Carl Stuart Miller
Attorney, Agent, or Firm—Felfe & Lynch

[57] ABSTRACT

A fuel injection system for dosing and atomizing fuel under high pressure into the cylinders of an internal combustion engine has a continuously operating, controllable-flow-rate fuel pump and at least one adjusting drive associated with injection nozzles respectively for each cylinder of the engine. The flow rate of the fuel pump is controlled by the sum of the fuel quantities to be fed per unit time to all of the injection nozzles for controlling the fuel dose injected into each cylinder. The adjusting drive at least opens a fuel path to the injection nozzle for each cylinder at the correct time to control the injection timing. Separating the dose and timing controls in this way simplifies the structure required for both controls.

27 Claims, 18 Drawing Figures

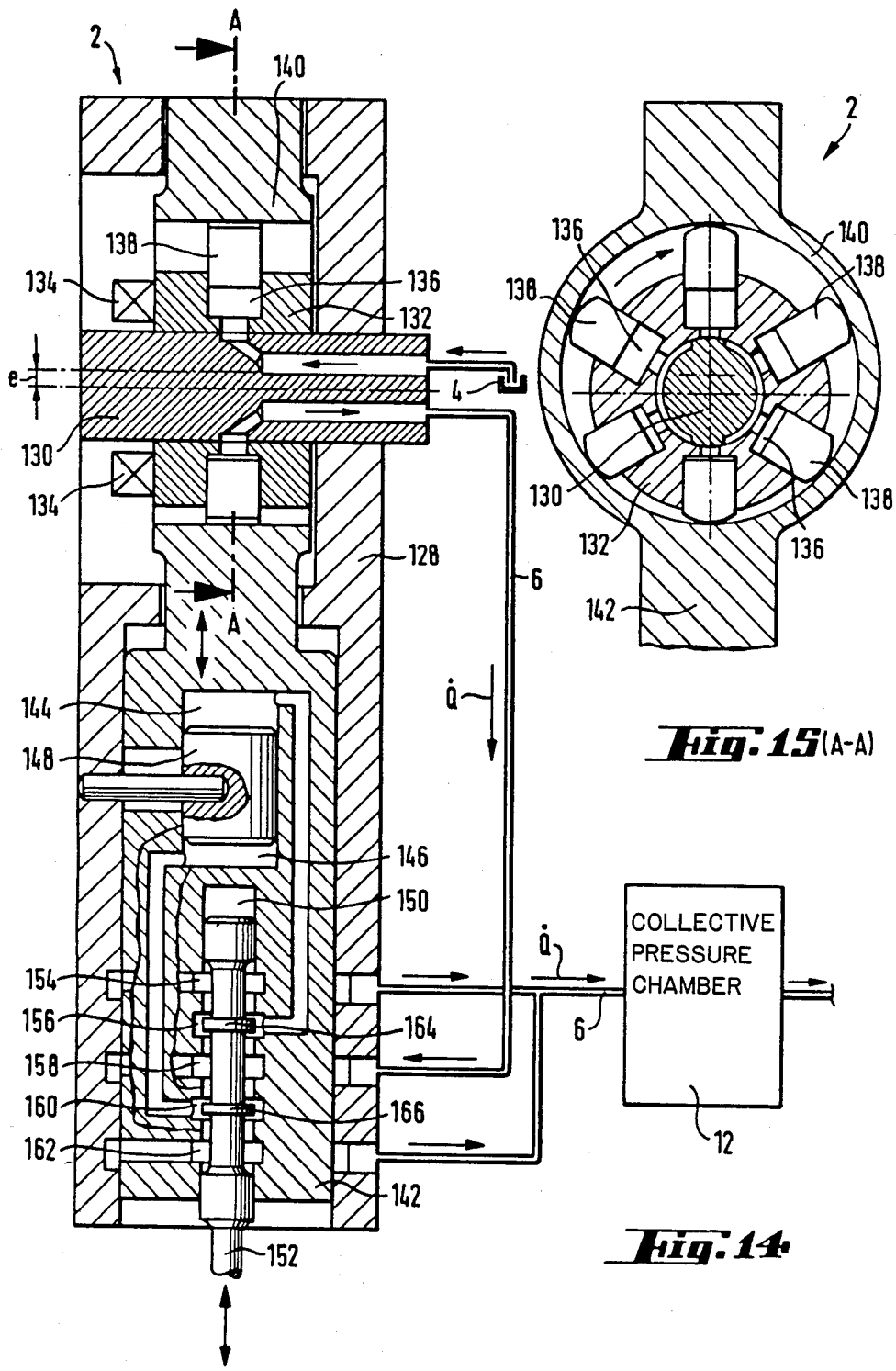

FUEL INJECTION SYSTEM

This is a continuation application of Ser. No. 122,951 filed on Feb. 20, 1980, now abandoned.

BACKGROUND OF THE INVENTION

The invention relates to a fuel injection system for dosing and atomizing fuel under high pressure into an internal-combustion engine.

A fuel injection system has the functions, for each cylinder of an internal-combustion engine, to dose precisely the quantity of fuel supplied as a function of an operating state, to introduce the fuel into the combustion air at the correct time and to atomize the fuel sufficiently finely via the pressure gradient prevailing at an injection nozzle.

Such a fuel injection system is applicable to both diesel and Otto engines, to both single-cylinder and multiple-cylinder engines, and to both direct injection into the cylinder and suction pipe injection. The fuel injection system according to the invention is however intended preferably for diesel engines with direct injection under high pressure into each individual engine cylinder.

Numerous fuel injection systems are known. In the majority of known injection systems, a mechanically or hydraulically driven piston pump doses the fuel into the combustion air intermittently at a controllable ties pressurises it, and displaces it through the injection nozzle. The quantity of fuel injected in this case is varied by varying the delivery stroke of the piston of the piston pump (so-called stroke regulation), by varying the quantity of fuel in the pump chamber of the piston pump (so-called charge regulation), or by varying the throttle cross-sections effective during the delivery (so-called throttle regulation).

It is also known to provide a separate pump piston for each cylinder of the internal-combustion engine in a series of pumps or pump/injection nozzle combinations. Distributor pumps are also known, wherein a plurality of cylinders of the internal-combustion engine are alternatively supplied from one pump piston in the pump.

These known injection systems have a number of disadvantages. They require one or more intermittently driven pump pistons. The structural outlay for the pump piston drive is high due to the intermittent loading. Furthermore, the fuel pump must controllably time the delivery for variable speed operation. The structural outlay for this purpose is substantial.

Lastly, a fuel injection system is also known wherein a non-periodic fuel pump delivers fuel at regulated pressures into a system common to all the cylinders of the internal-combustion engine. The injection quantity is regulated by the fuel pressure and the time cross-section of the injection nozzle at each cylinder—i.e., the integral of the free flow cross-section of injection orifice over the time. It is therefore necessary to control precisely the time cross-section of each injection nozzle. This is performed either mechanically or electromagnetically.

Even the last-mentioned injection system has serious disadvantages. In order for the fuel pump to be able to deliver at regulated pressure, it must deliver more fuel than is required for the injection, and the control of the time cross-section of the injection nozzles necessitates a considerable structural outlay. Control of the injection quantity by means of the time cross-section becomes increasingly difficult, or even impossible, as the injection time becomes shorter.

SUMMARY OF THE INVENTION

The underlying aim of the invention is to obviate the described disadvantages of the conventional injection systems. Particularly, it is proposed to develop a fuel injection system which requires a small structural outlay for drive and control means, operates reliably, and is particularly suitable for high pressures and short injection times.

This aim is achieved in a fuel injection system for dosing and atomizing fuel into an internal-combustion engine according to the invention by at least one injection nozzle for each cylinder of the internal-combustion engine, a continuously operating fuel pump with infinitely controllable flow rate controlled by the sum of the injection quantities to be fed per unit time to all the injection nozzles of the internal-combustion engine (so that the dosing of the injection quantities is controlled by means of the fuel pump), a fuel path forming a collective pressure chamber, preferably discretely into which the entire fuel flow from the fuel pump is introduced and to which every injection nozzle is connected, and at least one adjusting drive associated with each injection nozzle for opening the injection orifice of the latter at the correct time or phase. The end of the injection may also be controlled by the adjusting drive. However, on the one hand, the adjusting drive need only control the start of injection, and optionally the end of injection, but not the time cross-section of the injection, because the dosing of the injection quantity is not controlled by the opening to closing time cross-section of the injection nozzle. On the other hand, only the flow rate is regulated the fuel pump, and not the timing and duration of the injection.

Numerous advantages are attained by the construction of the fuel injection system according to the invention. Only one central fuel pump is necessary for delivering the fuel to be fed to the cylinders per unit of time. This fuel pump delivers continuously without pressure surges and therefore with a nonpulsatory driving torque. Its drive is therefore simple and excites no mechanical or acoustical vibrations. Moreover its drive need not occur in correct phase, and because the fuel pump delivers only the total quantity of fuel required per unit of time, its driving power requirement is minimalized.

The entire dosing of the injection quantity is controlled by adjusting the flow rate of the fuel pump. No other adjustments need be effected at the fuel pump. The flow rate regulation of the fuel pump requires only a small mechanical outlay, for example the fuel pump may be driven by the internal-combustion engine proportionally to the speed of the latter.

The timing of the injection is controlled by the adjusting drive, which merely has to control the start of the injection at the correct time and can therefore be constructed as a simple two-position-adjusting drive. If the injection is not in any case terminated before the end of the modulation of the adjusting drive, then the adjusting drive also determines the end of the injection and hence the injection period. Conjointly with the element which is actuates, the adjusting drive merely constitutes a switch.

Because the entire regulation of the fuel injection system according to the invention is the flow rate regulation of the fuel pump and the timing regulation of the adjusting drive, which is simply a two-position-adjusting drive, the mechanical outlay for regulating the fuel injection system according to the invention is extremely small. The modulation of the adjusting drive and the flow rate regulation are preferably effected by means of electrical signals or impulses which are supplied by electrical or electronic control devices which permit a plurality of parameters of influence, e.g., speed of the internal-combustion engine, load or accelerator position, state of the intake air, and cooling water temperature of the internal-combustion engine, etc., to be processed centrally and converted into appropriate control or adjustment quantities.

As an advantageous further development of the invention it may be provided that a flow throttle is constructed in nozzle pipes downstream of the collective pressure chamber, and downstream of the flow throttle a nozzle accumulator from which the fuel passes to the injection orifice during the injection. In the nozzle accumulator the fuel pressure falls rapidly during the injection below the pressure in the collective pressure chamber, and in the interval between two injections the pressure in the pressure accumulator increases slowly again. The injection starts with the modulation of the adjusting drive and terminates not later than when the adjusting drive reverts to its initial state. But the injection may end even beforehand if the injection nozzle closes spontaneously due to the pressure drop in the nozzle accumulator when the closing pressure of the injection nozzle is attained. Due to this it becomes possible to achieve shorter injection periods than those which result from the time interval between the start and end of the modulation of the adjusting drive. Extremely short injection periods become possible in this way.

As an advantageous further development of the above-described development, it may further be provided that, in parallel with the first arrangement comprising flow throttle and nozzle accumulator, in one or more bypass pipes, a second flow throttle, a second nozzle accumulator downstream of the second flow throttle and a way-valve are connected to the nozzle pipe, whilst the way through the bypass pipe to the injection orifice can be open at a different time from the way through the first arrangement. In this way the injection curve cn be influenced within wide limits in that the two or more nozzle accumulators which are associated with each injection nozzle, and which preferably have different size, are connected displaced in phase to the injection nozzle.

In the fuel injection system according to the invention it is preferred to use injection nozzles which exhibit a nozzle chamber from which the injection nozzle starts and which constitutes one end of the nozzle pipe, a displaceable nozzle needle extending through the nozzle chamber, which can open and close the injection orifice, and a nozzle spring which loads the nozzle needle in the closing direction and permits a displacement of the nozzle needle in the opening direction when the fuel pressure in the nozzle chamber exceeds a specific value. If such an injection nozzle is preceded by a way-valve in the nozzle pipe actuated by the adjusting drive, then the way-valve must be dimensioned so that it withstands the fuel pressures occurring and allows the total injection quantity to pass in the open state. In the case of the fuel pressures necessary for diesel engines and short injection periods, this necessitates comparatively large-dimensioned way-valves with comparatively large moving masses, which in turn necessitate comparatively high adjusting forces and thus a powerful adjusting drive.

As an advantageous development of the invention, therefore, in conjunction with the above-described injection nozzle, a hydraulically actuated shut-off valve in the nozzle pipe upstream of the nozzle chamber and a preliminary control valve actuated by the adjusting drive in a pipe branching from the nozzle pipe may be provided, whilst the modulated adjusting drive opens the preliminary control valve and thereby loads the shut-off valve with the fuel pressure in the opening direction. Because with this construction the adjusting drive need only actuate the preliminary control valve and the injection quantity does not flow through the preliminary control valve, so that its free flow cross-section can be small, the adjusting drive need exert only comparatively small adjusting forces, by which is comparatively small mass is moved for a short distance.

As an advantageous development of the invention it may be provided that the fuel pump is a piston pump of infinitely controllable delivery stroke of multiple radial construction or multiple axial construction. The fuel pump is preferably driven by the internal-combustion engine proportionally to the speed of the latter and it is provided with an adjusting member by means of which the delivery stroke of the fuel pump can be influenced, whilst the control quantity attacking the adjusting member is a function at least of the accelerator position of the internal-combustion engine. In order to keep the mechanical outlay for the actuation of the adjusting member of the fuel pump small, the adjusting forces required for the purpose should be as small as possible. It may therefore be provided as an advantageous embodiment of the invention that the fuel pump exhibits an adjusting piston slidable in the pump housing, by the position of which the delivery stroke of the fuel pump is determined and which is loaded with fuel pressures, and that the adjusting member is a sliding control slide valve which is arranged in the delivery stream in the pressure pipe of the fuel pump and at which the fuel pressure forces cancel each other, whilst the control slide valve adjusts the fuel pressures loading the adjusting piston by means of at least one variable throttle cross-section. Because the fuel pressures generated by the fuel pump itself are utilized to load the adjusting piston of the fuel pump, and the control slide valve is relieved of pressure, only very small adjusting forces need be exerted on the control slide valve and hence in order to adjust the flow rate of the fuel pump. The flow rate regulation occurs as a function of the speed of the internal-combustion engine and of its accelerator position and also optionally of other parameters of influence such as ambient temperature, ambient pressure, cooling medium temperature etc., by means of an electrical or electronic control device which delivers an electrical control signal on the basis of which an electromechanical adjusting drive actuates the control slide valve.

Further advantageous developments of the invention will emerge from the patent claims and from the following description of exemplary embodiments of the invention making reference to the drawings, wherein:

BRIEF DESCRIPTION OF THE DRAWINGS

FIG. 14 shows a first exemplary embodiment of the fuel pump of the injection system according to the invention;

FIG. 15 shows a sectional view along line A—A in FIG. 14;

DETAILED DESCRIPTION OF THE PREFERRED EMBODIMENT

Figure 1:
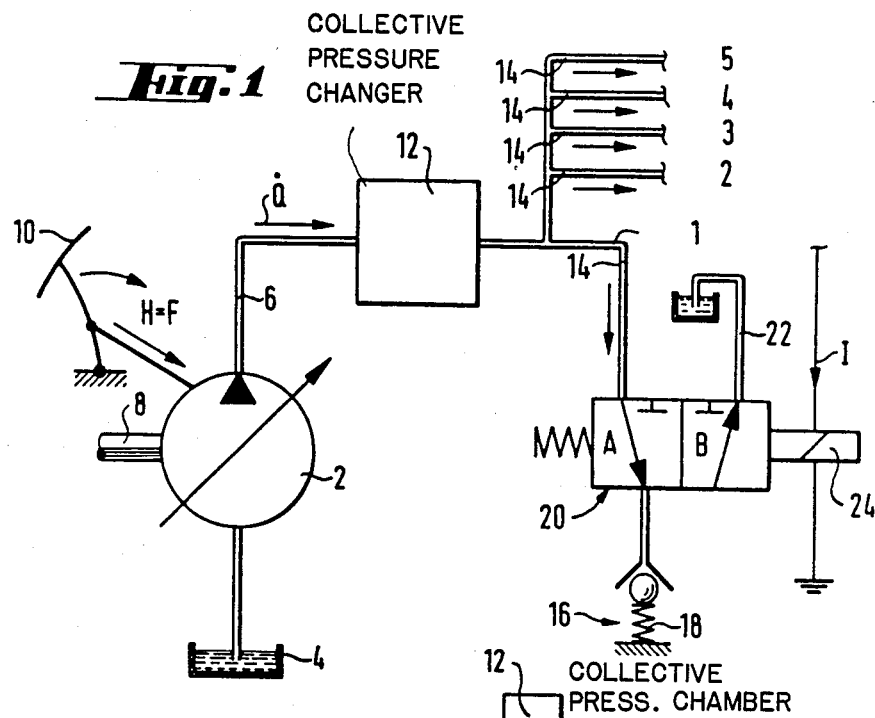
FIG. 1 shows schematically a first embodiment of the injection system according to the invention.

The injection system illustrated schematically in its simplest embodiment in FIG. 1 comprises a fuel pump 2 which delivers fuel from a fuel tank 4 under pressure into a pressure pipe 6. The fuel pump 2 is a continuously delivering fuel pump which is constructed e.g., as an axial pump or radial pump with a plurality of pump cylinders and pump pistons. The fuel pump 2 is driven at its driving shaft 8 by the internal-combustion engine, not shown, to which the fuel injection system belongs, at a speed proportional to the speed of the internal-combustion engine. The flow rate Q delivered by the fuel pump 2, i.e., the volume of fuel delivered by the fuel pump per unit of time, is infinitely controllable at the fuel pump. The control is effected by means of a control quantity signal F given to an adjusting member of the fuel pump 2, not shown in FIG. 1, which in the exemplary embodiment according to FIG. 1 is equal to a position signal H derived from the position of a drive lever or accelerator pedal 10. The flow rate Q is thus proportional to the speed of the internal-combustion engine and to the position signal H and is adjusted so that it is equal to the sum of all of the injection quantities to be fed per unit of time. The total flow rate Q passes through the pressure pipe 6 into a collective pressure chamber 12. From the collective pressure chamber 12 a particular nozzle pipe 14 leads to each of the cylinders, not shown in FIG. 1, of the internal-combustion engine, and issues into an injection nozzle 16 schematically illustrated in FIG. 1, which is shown for only one of the cylinders in FIG. 1. The injection nozzle 16 is maintained closed by a nozzle spring 18 and opened when the pressure of the fuel in the nozzle pipe 14 applied to the injection nozzle 16 exceeds a specific value. Upstream of the injection nozzle 16 a way-valve 20 is arranged in the nozzle pipe 14. Such a way-valve 20 is provided in each of the nozzle pipes 14, but illustrated only once in FIG. 1. In the exemplary embodiment illustrated the way-valve 20 is constructed as a 3/2 way-valve and maintains the nozzle pipe 14 open in its position A, whereas in its position B it blocks the nozzle pipe 14 and connects the injection nozzle 16 to a pressureless outlet 22. The way-valve 20 may also be constructed as a 2/2 way-valve which then, in its blocking position, merely blocks the nozzle pipe 14 without establishing a connection between the injection nozzle 16 and an outlet. Each of the way-valves 20 is actuated by an adjusting drive 24. The term adjusting drive is used for a drive means that delivers the force required to actuate a control element connected to the drive means. The adjusting drive 24 is shown only schematically in FIG. 1 and is preferably constructed as an electromagnet with a sliding armature. The adjusting drive 24 itself is modulated (i.e. activated) by a current impulse I generated in correct phase by means of a control device not shown, and maintains the way-valve 20 in its position A during the period of the current impulse I.

In service the fuel pump 2 delivers continuously the flow rate Q which is proportional to the speed of the internal-combustion engine and is infinitely adjusted in conformity with the operating conditions by means of the control quantity signal F. For each cylinder of the internal-combustion engine the control device supplies the current impulse I in correct phase for a specific period. The adjusting drive 24 maintains the way-valve 20 in its position A for the period of the current impulse I, so that fuel can flow out during the open period of the injection nozzle 16 determined by the impulse period. The pressure in the collective pressure chamber 12 is then automatically adjusted so that the total flow rate Q is discharged during the open periods of the injection nozzles 16.

A second embodiment of the injection system according to the invention is explained hereinbelow with reference to FIG. 2. Parts and elements which are identical to parts and elements of the first embodiment according to FIG. 1 are designated by the same reference numerals in FIG. 2 and will not be explained afresh. Differing from the embodiment according to FIG. 1, in the embodiment according to FIG. 2 there is constructed in each nozzle pipe 14, downstream of the collective pressure chamber 12 a flow throttle 26, and downstream of the flow throttle 26 an accumulator chamber which is designated the nozzle accumulator 28 because it is associated with an injection nozzle in each case.

So long as the adjusting drive 24 associated with an injection nozzle 16 is not modulated by a current impulse I, the way-valve 20 is closed and pressure builds up gradually in the associated nozzle accumulator 28. Then when the way-valve 20 is opened and consequently the associated injection nozzle 16 opens, the fuel flows away from the nozzle accumulator 28 through the injection nozzle, whilst the pressure in the nozzle accumulator 28 decays rapidly due to the preceding flow throttle 26. This has the result that the pressure in the nozzle pipe 14 upstream of the injection nozzle 16 falls below the closing pressure of the injection nozzle 16, so that the latter closes and the injection ends before the adjusting drive 24 brings the way-valve 20 into its closed position. In this manner short injection periods are obtained which are shorter than the period of the current impulse I.

Figure 2:
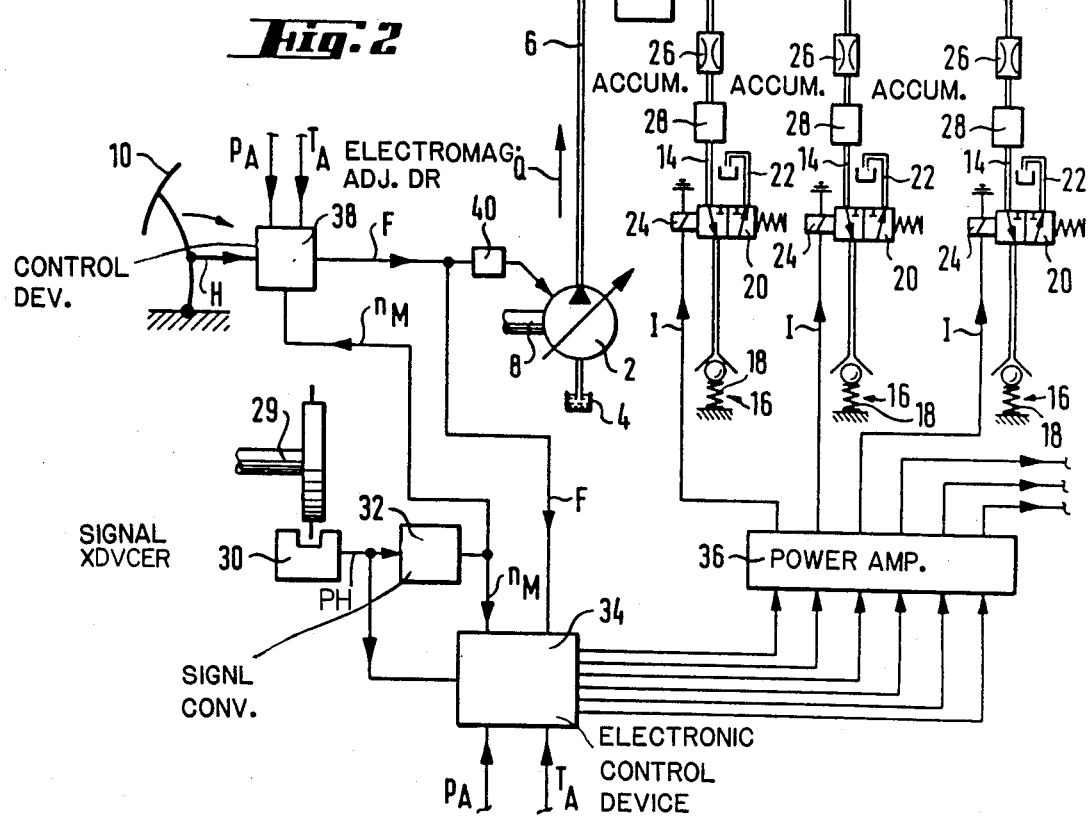
FIG. 2 shows schematically a second embodiment of the injection system according to the invention.

FIG. 2 also shows schematically the control devices to generate the current impulses I and the control quantity signal F. A signal transducer 30 picks up from the crankshaft or the camshaft 29 of the internal-combustion engine impulses in correct phase, the frequency of which is proportional to the speed of the internal-combustion engine, and supplies a phase signal Ph. The phase signal Ph is passed on the one hand to a signal converter 32, which generates a speed signal $n_M$, and on the other hand to an electronic control device 34 which is also fed with the speed signal $n_M$ and further signals which are a function of the operating state of the internal-combustion engine and of the ambient conditions, e.g., an ambient pressure signal $p_A$ and an ambient temperature signal $T_A$. The control device 34 supplies for each cylinder of the internal-combustion engine engine-synchronous current impulses I regulated in their phase position and duration, which are amplified by a power amplifier 36 and fed by the latter to the adjusting drive 24, constructed as electromagnets, associated with the individual injection nozzles 16.

The speed signal $n_M$ is also passed to a second control device 38 which is fed additionally with the position signal H derived from the position of the drive lever 10 and with the ambient pressure signal $p_A$ and the ambient temperature signal $T_A$ and generates the control quantity signal F which is passed to an electromechanical adjusting device 40 which actuates the adjusting member, not shown, of the fuel pump 2 in order to adjust its flow rate. The control quantity signal F is also passed to the control device 34 and participates in the generation of current impulses I.

It is clear that in the fuel injection system according to the invention the only control and regulation processes which have to be performed mechanically are the adjustment of the flow rate of the fuel pump 2 and the opening in correct phase of the injection nozzles.

Figure 3:
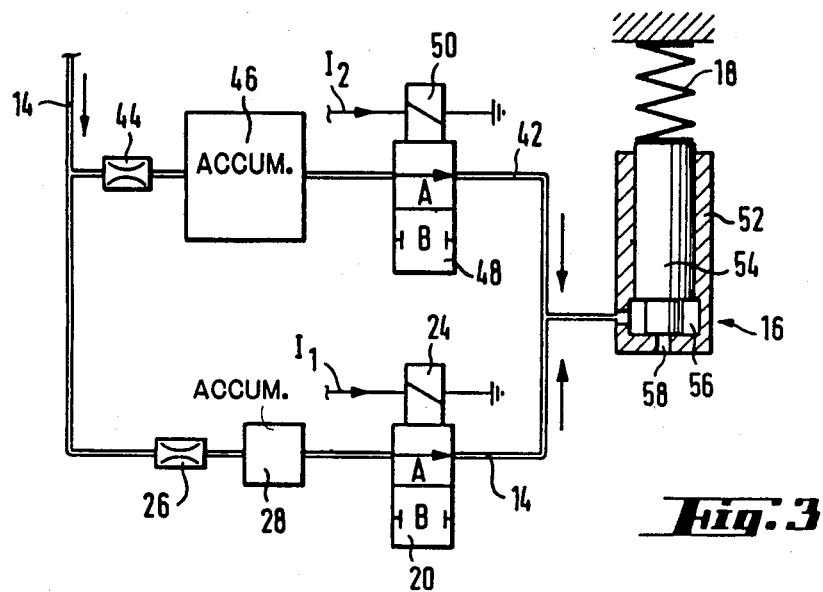
FIG. 3 shows schematically and as a detail a third embodiment of the injection system according to the invention.

FIG. 3 shows schematically and as a detail a third embodiment of the invention, in which once again the same reference numerals are used for parts and elements already explained and said parts and elements are not explained afresh.

A bypass pipe 42 is connected in parallel with the nozzle pipe 14. The bypass pipe 42 contains a second flow throttle 44, arranged downstream of the latter a second nozzle accumulator 46, and downstream of the latter a second way-valve 48 which is maintained in its open position by a second adjusting drive 50, whilst the second adjusting drive 50 is modulated by a current impulse $I_2$. The fuel injection system according to FIG. 3 thus exhibits a second arrangement of flow throttle 44 and nozzle accumulator 46 in parallel with the first arrangement of flow throttle 26 and nozzle accumulator 28, so that it is possible to influence the injection curve by different dimensioning of the nozzle accumulators 28 and 46 and by different phase positions and periods of the current impulses $I_1$ and $I_2$ by which the adjusting drives 24 and 50 constructed as electromagnets are modulated. This possibility can be utilized, e.g., for the preinjection or fuel.

As may be seen in FIG. 3, in the exemplary embodiment illustrated the way-valves 20 and 48 are constructed as 2/2 way-valves.

FIG. 3 also shows more accurately the construction of the injection nozzle 16, which exhibits a nozzle needle 54 slidable in an injection nozzle housing 52 and projecting into a nozzle chamber 56 which constitutes the end of the nozzle pipe 14 and from where the injection orifice 58 starts. The nozzle needle 54 is acted on by the nozzle spring 18 which presses against the nozzle needle in the closing direction so that the nozzle needle maintains the injection orifice 58 closed until the pressure in the nozzle chamber 56 exceeds a specific value.

Figure 4:
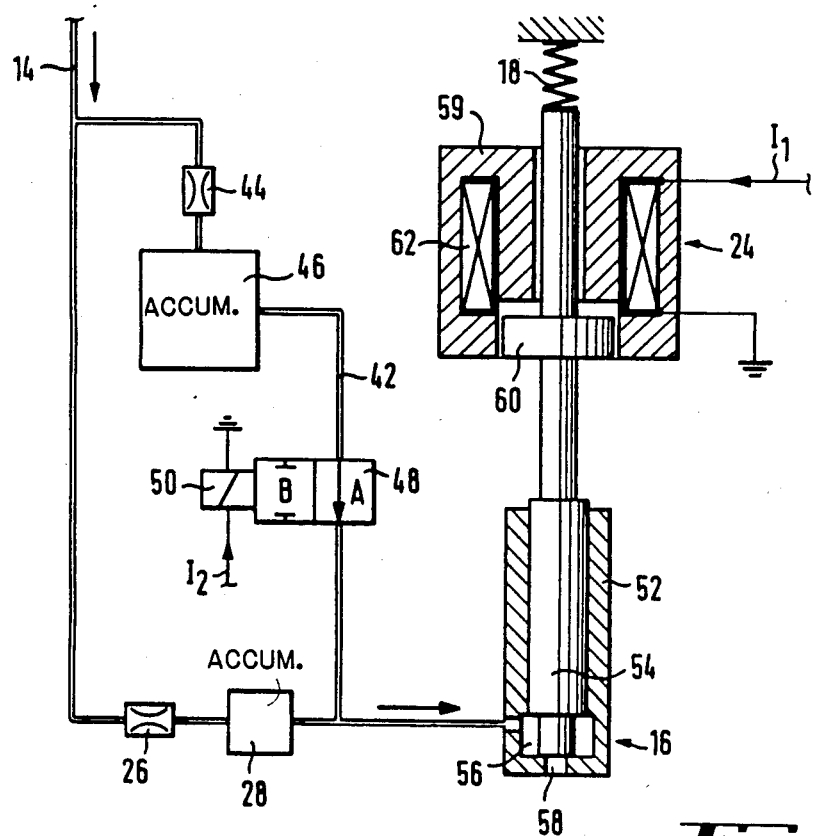
FIG. 4 shows schematically a variant of the third embodiment according to FIG. 3.

FIG. 4 shows a variant of the injection system illustrated in FIG. 3. The injection system illustrated in FIG. 4 differs from the injection system according to FIG. 3 substantially in the construction of the injection nozzle 16, the arrangement of the adjusting drive 24 and the absence of a way-valve in the nozzle pipe 14.

The nozzle spring 18 of the injection nozzle 16, which has the same construction as the injection nozzle 16 according to FIG. 3, is pretensioned so that the nozzle needle 54 maintains the injection orifice 58 closed even at the maximum fuel pressure occurring in the nozzle chamber 56. The injection orifice 58 is however opened when an additional force acts upon the nozzle needle 54 in the opening direction. Said force is exerted by the adjusting drive 24 during the period of the current impulse $I_1$. The adjusting drive 24 is constructed as an electromagnet which exhibits, in a magnet housing 59, a solenoid 62 and a moving armature 60. The moving armature 60 is connected firmly to the nozzle needle 54 which extends through the housing 59 and is loaded at its top end in FIG. 4 by the nozzle spring 18.

When the adjusting drive 24 is loaded by the current impulse $I_1$, the nozzle needle 54 opens the injection orifice 58 so that the fuel stored in the nozzle accumulator 28 is discharged through the injection nozzle, whilst initially the bypass pipe 42 is still maintained closed by means of the second way-valve 48. Then, with a certain phase displacement with reference to the current impulse $I_1$, the second adjusting drive 50 is loaded with the current impulse $I_2$, so that the second way-valve 48 opens and the fuel is injected out of the second nozzle accumulator 46.

The combination of the injection nozzle 16 and the adjusting drive 24 illustrated in FIG. 4 may also be provided in the case of the embodiments according to FIGS. 1 and 2 instead of the combination of injection nozzle, way-valve and adjusting drive provided there.

Figure 5:
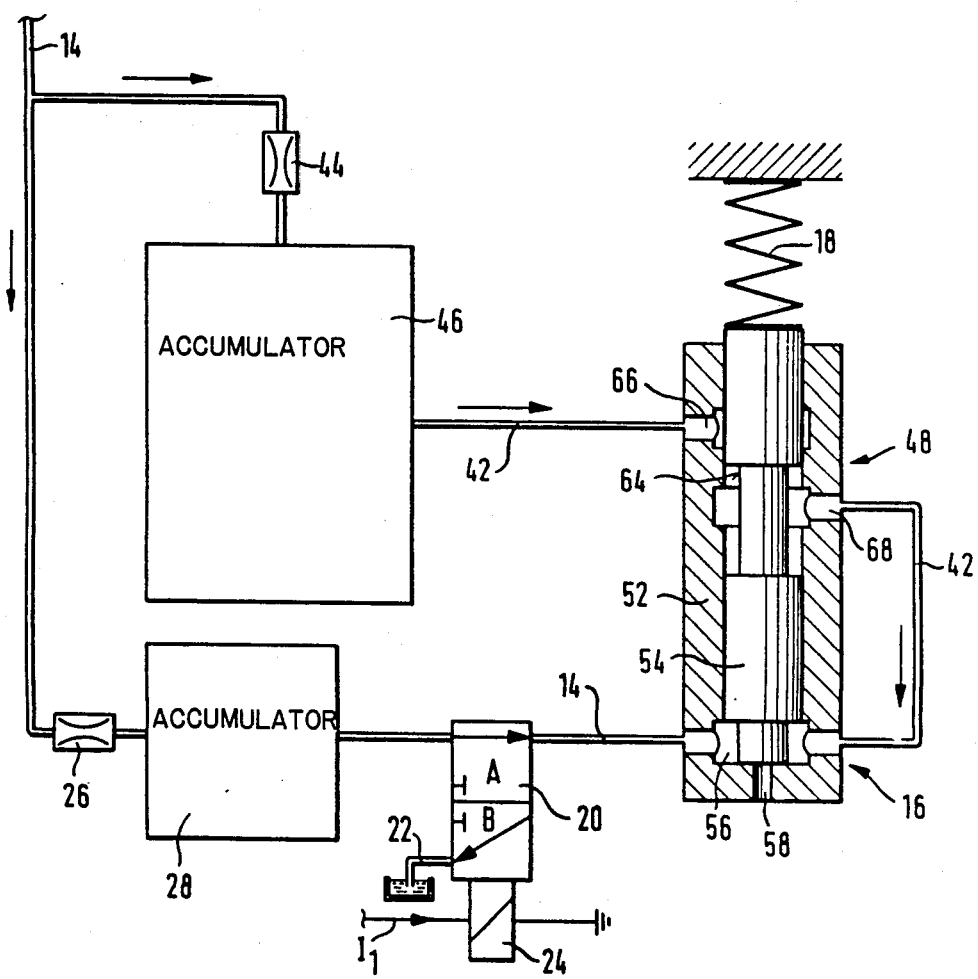
FIG. 5 shows schematically a further variant of the third embodiment according to FIG. 3.

FIG. 5 shows a further variant of the exemplary embodiment of the injection system illustrated in FIG. 3. The variant illustrated in FIG. 5 differs from the injection system according to FIG. 3 in that the second way-valve 48 is combined with the injection nozzle 16 and the injection nozzle itself constitutes the adjusting drive for the second way-valve 48.

In the injection system according to FIG. 5 the nozzle spring 18 is pretensioned so that the nozzle needle 54 opens the injection orifice 58 when the pressure of the fuel in the nozzle chamber 56 exceeds a specific value. The top end in FIG. 5 of the nozzle needle 54 is constructed as a valve element with an annular groove 64 which can open and close the communication between an inlet 66 and an outlet 68 which are constructed in the injection nozzle housing 52 and located in the bypass pipe 42. The section of the bypass pipe 42 arranged downstream of the outlet issues into the nozzle chamber 56. The communication between the inlet 66 and the outlet 68 is opened when the nozzle needle 54 has executed a specific stroke.

In service the nozzle pipe 14 is initially opened by the current impulse $I_1$, so that the nozzle needle 54 opens the injection orifice 58 and the injection commences with fuel from the first nozzle accumulator 28. During its upward stroke the nozzle needle 54 opens the second way-valve 48, i.e., the communication between the inlet 66 and the outlet 68, so that the fuel from the second nozzle accumulator 46 is then also injected. Although the nozzle needle 54 constitutes the adjusting drive of the second way-valve 48, this produces no additional forces upon the nozzle needle.

Figure 6:
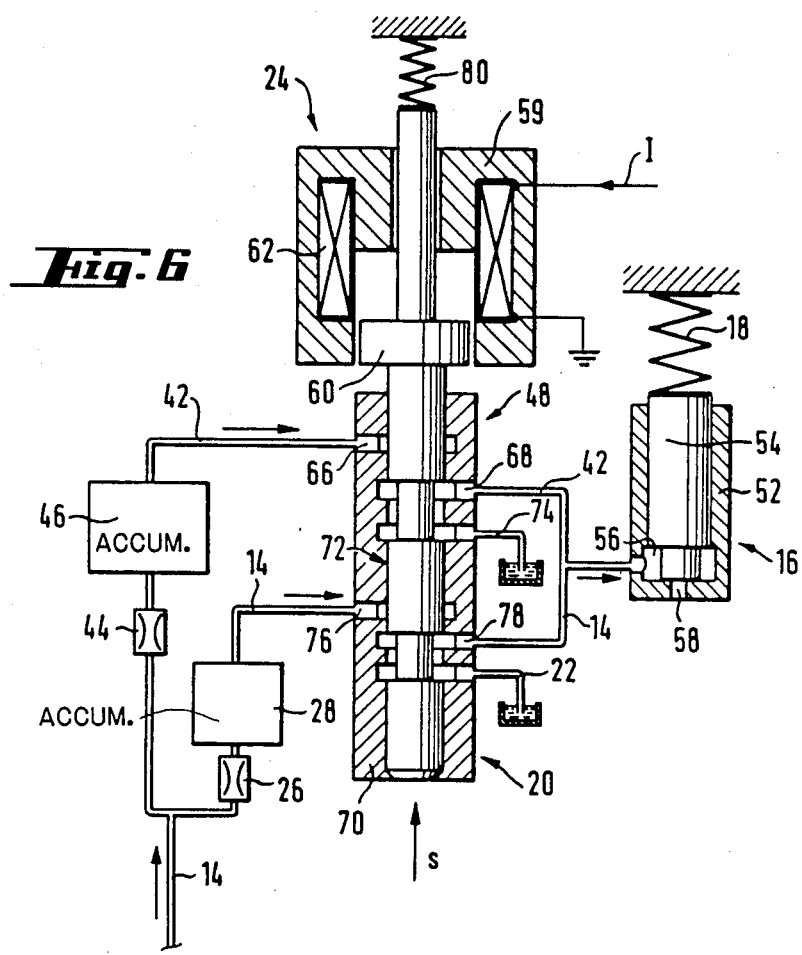
FIG. 6 shows schematically a further variant of the third embodiment according to FIG. 3.

FIG. 6 shows a further variant of the embodiment illustrated in FIG. 3. In the injection system according to FIG. 6 the two way-valve 20 and 48 are combined structurally into a unit so that they are actuated in common by the sole adjusting drive 24.

The injection nozzle 16 opens when the pressure of the fuel in the nozzle chamber 56 exceeds a specific value.

The unit constituted by the two way-valves comprises a housing 70 and a valve slide 72 which can open and close the communication between the inlet 66 and the outlet 68 of the first way valve 48 and also establishes a communication between the outlet 68 and an outlet 74 when the communication between the inlet 66 and the outlet 68 is blocked. The valve slide 72 can also open and close a communication between an inlet 76 and an outlet 78 which are constructed in the housing 70 and associated with the first way-valve 20, and can also establish a communication between the outlet 78 and the outlet 22 of the first way-valve 20 when the communication between the inlet 76 and the outlet 78 is blocked.

The valve slide 72 is maintained in its closed position, illustrated in FIG. 6, by a valve spring 80. When the adjusting drive 24 is loaded by the current impulse I, the valve slide 72 initially opens both outlets 22 and 74 simultaneously. Whilst the valve stroke s is increasing—i.e., the valve slide 72 moves further upwards in FIG. 6—the valve slide 72 first opens the communication between the inlet 76 and the outlet 78 of the first way-valve 20, whereafter it opens the communication between the inlet 66 and the outlet 68 of the second way-valve 48, so that the injection occurs initially from the first nozzle accumulator 28 and then also from the second nozzle accumulator 46.

The force of the adjusting device 24 is transmitted to the valve slide 72 in that the armature 60 of the adjusting drive constructed as an electromagnet is firmly connected to the valve slide 72.

Figure 6A:
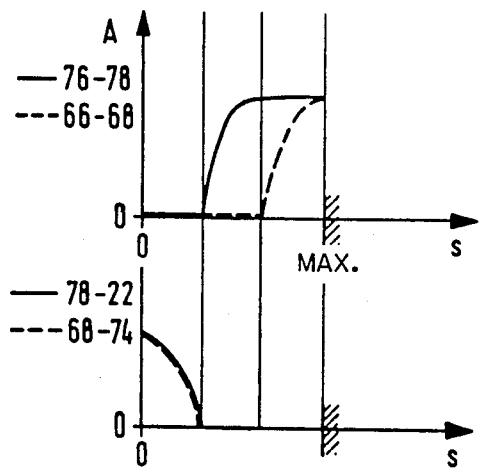
FIG. 6a is a control diagram of the embodiment of FIG. 6.

In the control diagram illustrated in FIG. 6a the various free valve crosssections A are shown as a function of the valve stroke s for the embodiments according to FIG. 6.

Figure 7:
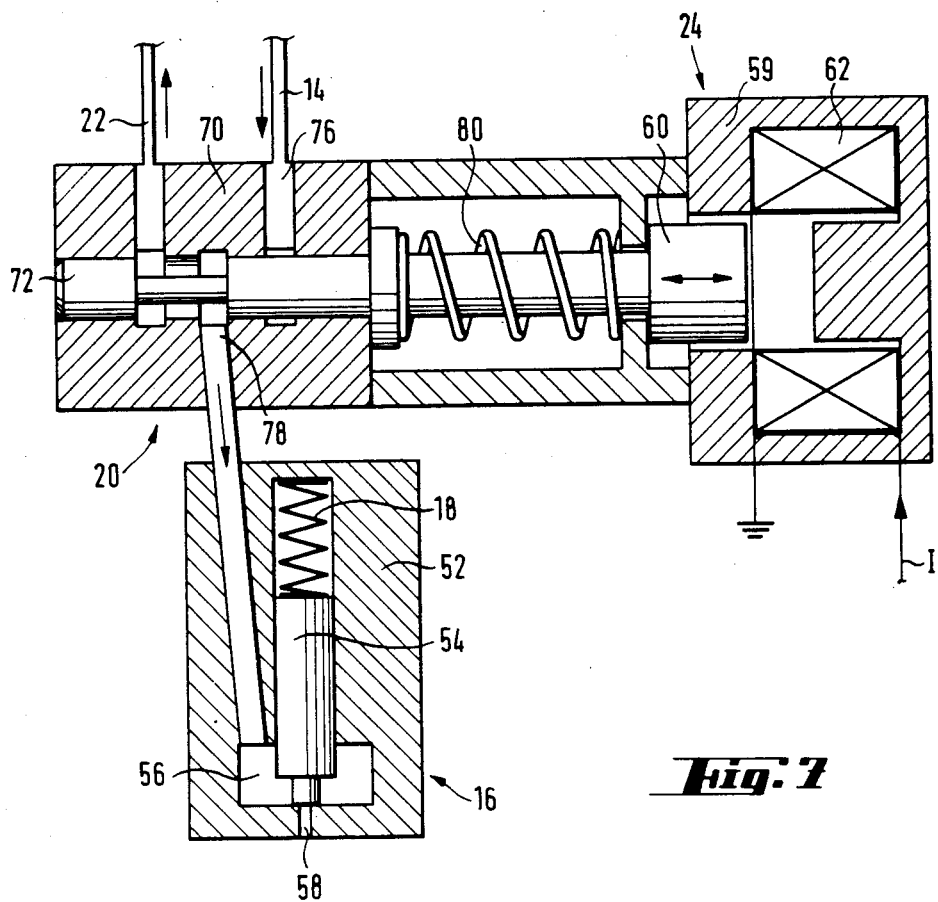
FIG. 7 shows a first exemplary embodiment of the injection valve, the way-valve and the adjusting drive of the injection system according to the invention.

FIG. 7 shows in greater detail a first exemplary embodiment of a combination of injection nozzle 16, way-valve 20 and adjusting drive 24, as it is applicable to the embodiments according to FIGS. 1 and 2 of the injection system. With appropriate variation, the combination according to FIG. 7 may also be applied to the embodiment according to FIG. 3, the variation consisting solely in the fact of providing a connection for the bypass pipe 42 downstream of the way-valve 20 in FIG. 7.

Here, as in all the other Figures, the same reference numerals are used for parts and elements in FIG. 7 which are identical to parts and elements of the exemplary embodiments previously described.

The adjusting drive 24 is constructed as an electromagnet with a solenoid 62 in a magnet housing 59 and with a moving armature 60. The valve slide 72 of the way-valve 20 constructed as a 3/2 way-valve is firmly connected to the armature 60. The valve slide 72 is slidable in the housing 70 and, in its position illustrated in FIG. 7, connects the outlet 22 to the outlet 78, to which the nozzle chamber 56 of the injection nozzle 16 is connected. When, the adjusting drive 24 being modulated by the current impulse I, the valve slide 72 is slid out of its position illustrated counter to the force of the valve spring 80 towards the right-hand side of FIG. 7, it connects the inlet 76 to the outlet 78, so that the nozzle chamber 56 is then pressure loaded and the nozzle needle 54 is displaced counter to the pretensioning force of the nozzle spring 18 and opens the injection orifice 58.

Figure 8:
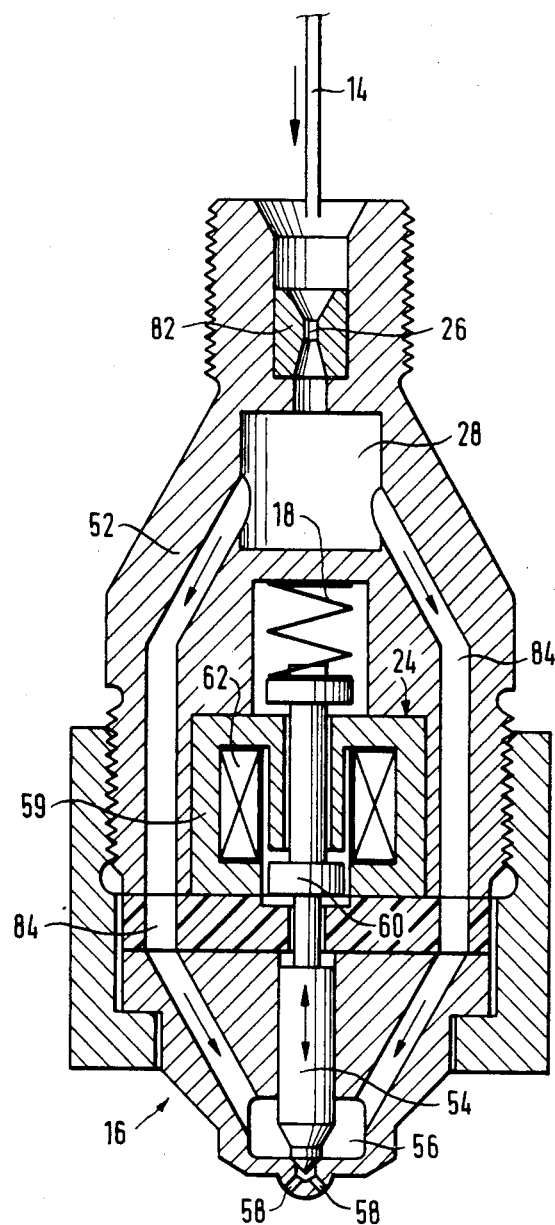
FIG. 8 shows a second exemplary embodiment of the injection nozzle and associated elements of the injection system.

FIG. 8 shows a second exemplary embodiment of the combination of injection nozzle 16 and adjusting drive 24, which is suitable for the injection system according to FIG. 2. In the combination illustrated in FIG. 8, the flow throttle 26, the nozzle accumulator 28 and the adjusting drive 24 are structurally integrated in the injection nozzle housing 52. In a recess at the top end (in FIG. 8) of the injection nozzle housing 52 there is fitted an insert 82 in which the flow throttle 26 is constructed. Downstream of the insert 82, coaxially thereto in the injection nozzle housing 52, there is constructed the nozzle accumulator 28, from which a plurality of channels 84 lead through the injection nozzle housing to the nozzle chamber 56. Between the nozzle accumulator 28 and the nozzle chamber 56 the injection nozzle housing contains a further chamber in which the adjusting drive 24 is arranged coaxially, being constructed in an electromagnet, and attacks the nozzle needle 54 directly by its armature 60. The nozzle spring 18 arranged in a further recess of the injection nozzle housing, above the adjusting drive 24 in FIG. 8, maintains the nozzle needle 54 in its closed position counter to the maximum fuel pressure occurring. The nozzle needle 54 is slid in the opening direction only when the current impulse I modulates the adjusting drive 24.

As may be seen in FIG. 8, the injection nozzle may also be constructed as a multiple-hole nozzle, differently from the exemplary embodiments described hitherto.

Figure 9:
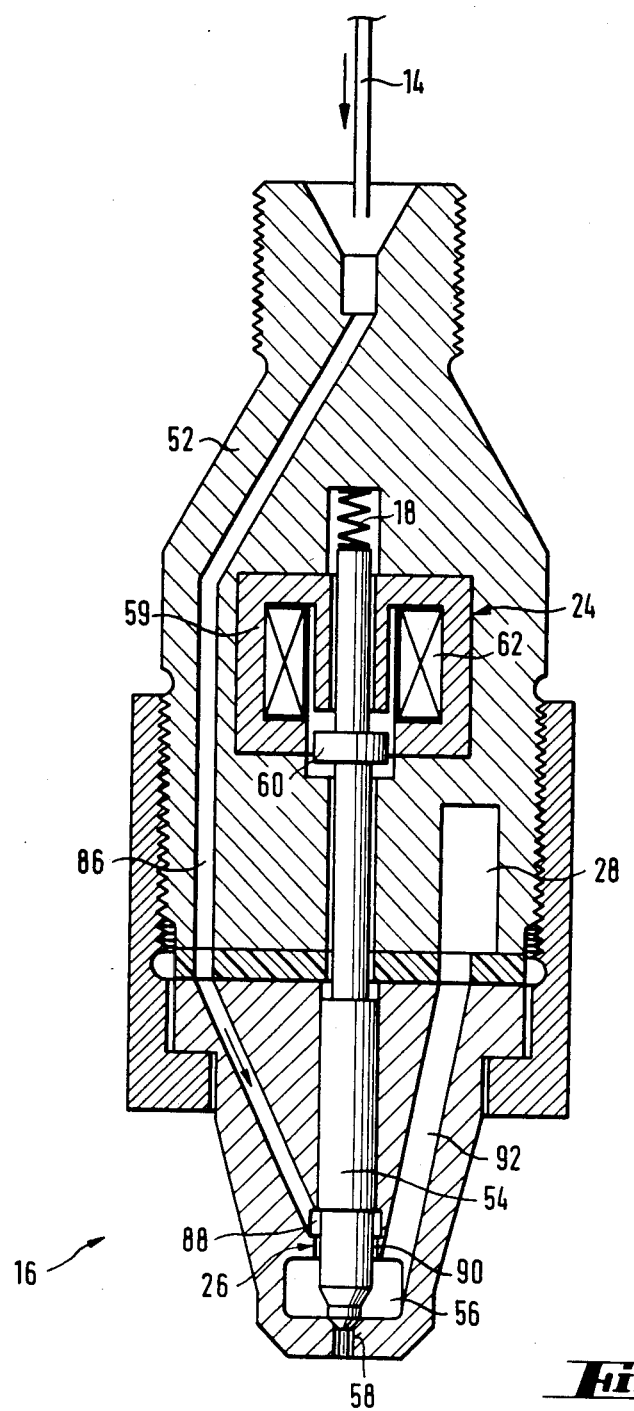
FIG. 9 shows a third exemplary embodiment of the injection nozzle and associated elements of the injection system.

FIG. 9 shows a variant of the combination of injection nozzle 16, adjusting drive 24, flow throttle 26 and nozzle accumulator 28 illustrated in FIG. 8. In the variant according to FIG. 9, a channel 86 leads from the recess at the top end of the injection nozzle housing 52 to an annular chamber 88 surrounding the nozzle needle 54, which is connected to the nozzle chamber 56 by an annular gap 90 surrounding the nozzle needle, whilst the annular gap constitutes the flow throttle 26. The nozzle accumulator 28 is constructed in the injection nozzle housing 52 and connected to the nozzle chamber 56 by a channel 92. The function of the embodiment according to FIG. 9 is identical to the function of the embodiment according to FIG. 8.

Figure 10:
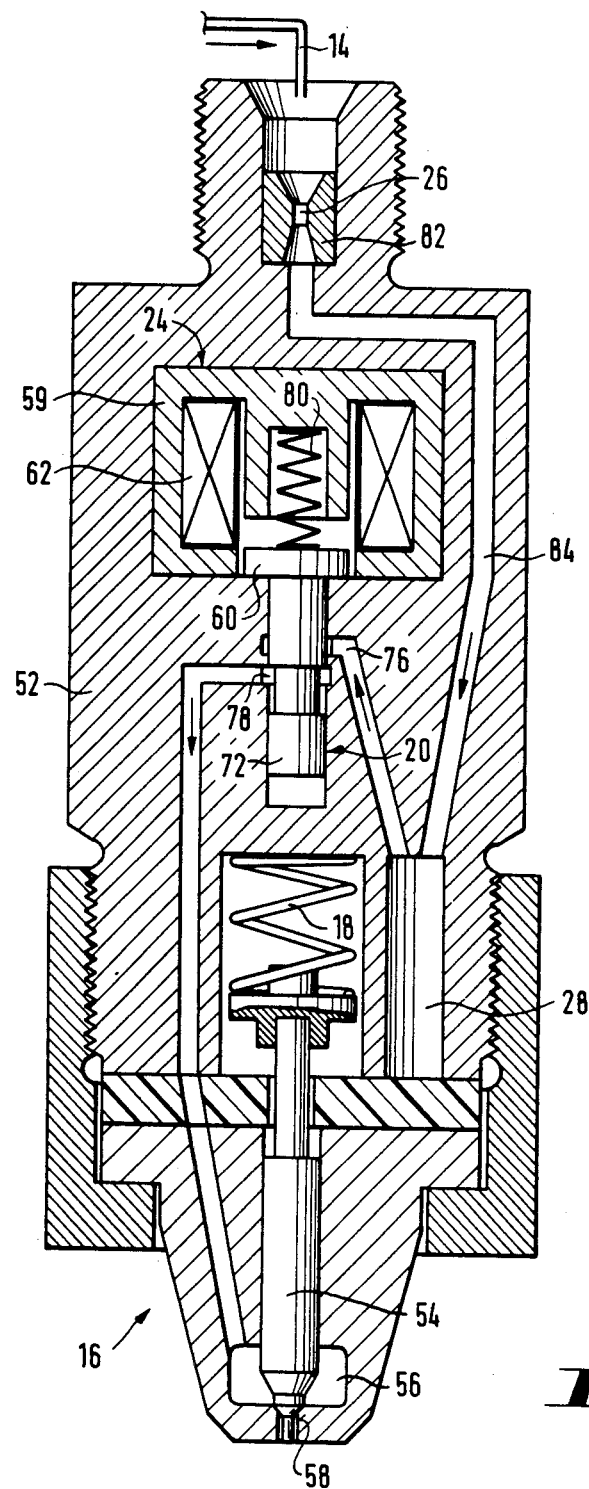
FIG. 10 shows a fourth exemplary embodiment of the injection nozzle and associated elements of the injection system.

FIG. 10 shows a further variant of the combination of injection nozzle 16, adjusting drive 24, flow throttle 26 and nozzle accumulator 28 illustrated in FIG. 8, in which a way-valve 20 is additionally integrated in the injection nozzle housing 52. In the embodiment according to FIG. 10, the nozzle spring 18 has such a pretension that the nozzle needle 54 opens the injection orifice 58, constructed e.g., as a pintle nozzle, when the pressure of the fuel in the nozzle chamber 56 exceeds a specific value. The way-valve 20 which is thereby necessary is constructed as a 2/2 way-valve in the exemplary embodiment illustrated, and exhibits as valve element the valve slide 72 which is connected firmly to the armature 60 of the adjusting drive 24 constructed as an electromagnet, and is arranged coaxially to the nozzle needle 54. The valve slide 72 blocks and opens the channel 84 between the flow throttle 26 and the nozzle chamber 56 when it respectively opens and blocks the communication between the inlet 76 and the outlet 78 of the way-valve 20. The injection starts when the adjusting drive 24 is modulated by the current impulse I and the way-valve 20 is thereby opened and the nozzle needle 54 raised, and ends when the pressure in the nozzle accumulator 28 has fallen below the closing pressure of the injection nozzle 16, or if the current impulse I ends previously.

Figure 11:
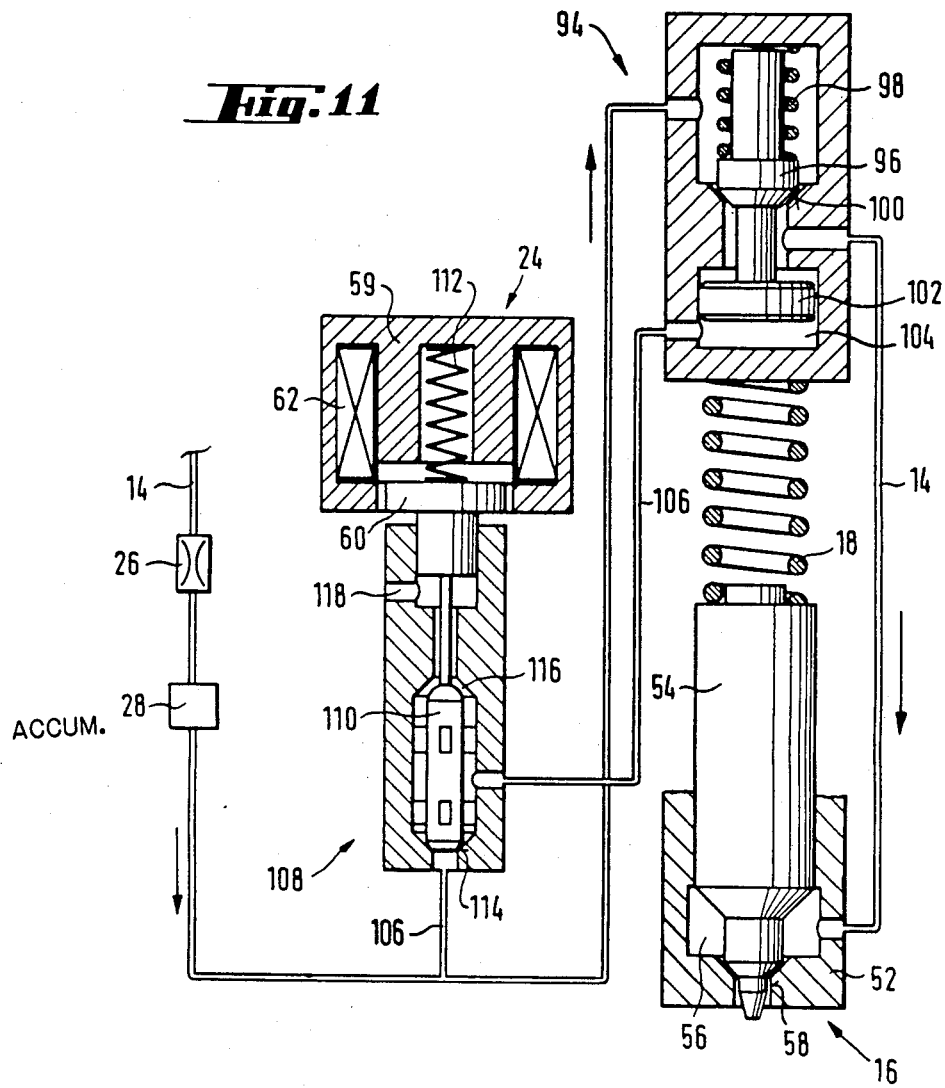
FIG. 11 shows a fifth exemplary embodiment of the injection nozzle and associated elements of the injection system.

FIG. 11 shows a preferred exemplary embodiment of the arrangement of injection nozzle 16 and adjusting drive 24 which is suitable for the embodiments of the injection system according to FIGS. 1 and 2, although in FIG. 11 it is shown in conjunction with a preceding flow throttle 26 and a nozzle accumulator 28 according to FIG. 2.

In the nozzle pipe 14 downstream of the nozzle accumulator 28 and upstream of the injection nozzle 16 there is arranged a shut-off valve 94 which exhibits a valve element 96 which is loaded by a valve spring 98 in the direction of its closed position in which the valve element 96 maintains a control cross-section 100 closed, so that the nozzle pipe 14 is blocked. Constructed integrally with the valve element 96 is a control piston 102 which is housed slidably in a control chamber 104 and is exposed to the pressure prevailing therein, whilst the pressure in the control chamber 104 causes at the control piston 102 a force in the opening direction of the shut-off valve 94.

The injection nozzle 16, the injection orifice 58 of which is constructed as a pintle nozzle, is maintained closed by its nozzle spring 18 until the pressure in the nozzle chamber 56 exceeds a specific value.

Downstream of the nozzle accumulator 28 and upstream of the shut-off valve 94 there is branched from the nozzle pipe 14, a pipe 106 in which a preliminary valve 108 is arranged which is actuated by the adjusting drive 24, which is constructed as an electromagnet in the manner already described. The hydraulic preliminary control valve 108 exhibits a vavle element 110 which, due to the force of a valve spring 112, either maintains a control cross-section 114 closed or maintains a control cross-section 116 closed whilst the adjusting drive 24 is loaded by the current impulse I.

The pipe 106 branched from the nozzle pipe 14 leads to the control chamber 104. When the control cross-section 114 is closed, the pipe 106 is blocked and the control chamber 104 is connected by the control cross-section 116, then open, to an outlet 118. When, with the adjusting drive 24 modulated, the control cross-section 116 is closed, the control chamber 104 communicates through the pipe 106 and the open control cross-section 114 with the nozzle pipe 14, so that the pressure of the fuel in the nozzle pipe 14 prevails in the control chamber 104.

When the adjusting drive 24 is modulated, therefore, the control chamber 104 is loaded with pressure from the nozzle accumulator 28, so that the valve element 96 is slid upwards in FIG. 11 counter to the force of the valve spring 98 and opens the shut-off valve 94. Consequently the fuel pressure enters the nozzle chamber 56, so that the injection valve 16 opens and the injection starts. The injection ends either when, during the injection, the fuel pressure in the nozzle accumulator 28 has fallen to the closing pressure of the injection nozzle and the nozzle needle 56 closes the injection orifice 58, or when, at the end of the current impulse I, the valve spring 112 opens the control cross-section 116 and closes the control cross-section 114. This causes the pressure below the control piston 102 to fall, so that the control cross-section 100 is closed due to the force of the valve spring 98.

As is clear from the above description, in the exemplary embodiment according to FIG. 11 the fuel to be injected does not flow through the preliminary control valve 108, so that the latter can be of considerably small construction and the masses to be moved by the adjusting drive 24 are small.

Figure 12:
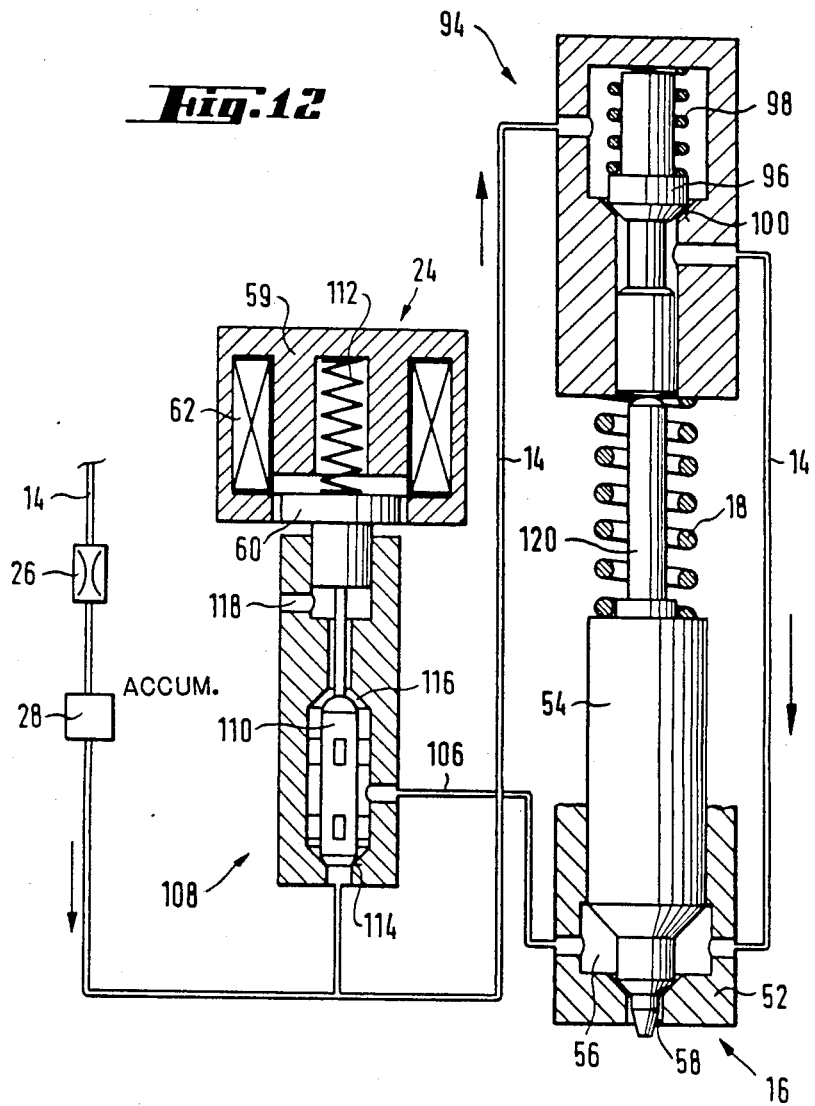
FIG. 12 shows a sixth exemplary embodiment of the injection nozzle and associated elements of the injection system.

FIG. 12 shows a variant of the exemplary embodiment according to FIG. 11, for which reason only the differences from the exemplary embodiment previously described will be explained hereinbelow.

In the exemplary embodiment according to FIG. 12 the pipe 106 issues into the nozzle chamber 56. Instead of the control piston 102 and of the control chamber 104 of the exemplary embodiment according to FIG. 11, the exemplary embodiment according to FIG. 12 exhibits a projection 120 shaped on the nozzle needle 54, against which the valve element 96 is braced. The actuation of the shut-off valve 94 therefore occurs by the nozzle needle 54 during its upward stroke.

When the control cross-section 114 is opened because the adjusting drive 24 is modulated by the current impulse I, the pressure of the fuel in the nozzle accumulator 28 enters the nozzle chamber 56, so that the nozzle needle 54 is raised and thereby both opens the injection orifice 58 and also brings the shut-off valve 94 into its open position. The injection ends when the pressure in the nozzle chamber 56 has fallen below the closing pressure of the injection nozzle 16 due to the flow throttle 26, or when, at the end of the current impulse I, the control cross-section 114 is closed and the control cross-section 116 is opened, so that the nozzle chamber 36 thereby comes to communicate with the outlet 118, which results in a lowering of pressure in the nozzle chamber 56 and hence closure of the injection nozzle 16.

Figure 13:
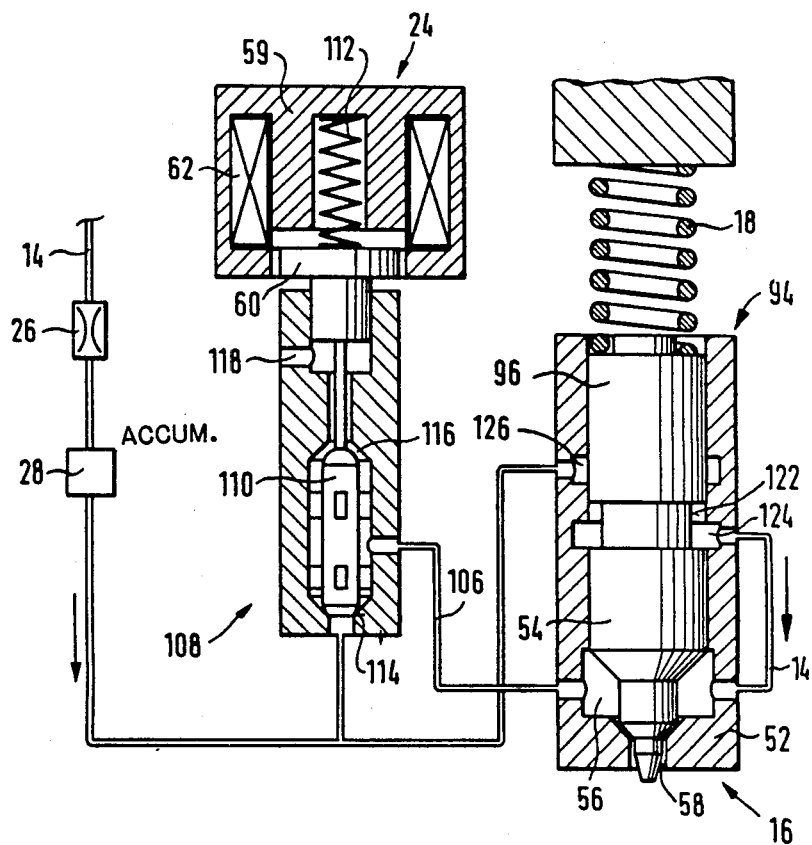
FIG. 13 shows a seventh exemplary embodiment of the injection nozzle and associated elements of the injection system.

FIG. 13 shows a variant of the exemplary embodiment illustrated in FIG. 12, where the difference consists in the fact that in the exemplary embodiment illustrated in FIG. 13 the nozzle needle 54 and the valve element 96 of the shut-off valve 94 are integrally constructed so that the nozzle needle 54 directly actuates the shut-off valve 94. The valve element 96 exhibits an annular groove 122 which cooperates with two annular grooves 124 and 126 in the injection nozzle housing 52 so that the shut-off valve 94 blocks the nozzle pipe 14 in the position shown in FIG. 13, whereas the annular grooves 124 and 126 communicate mutually through the annular groove 122 when the nozzle needle 54 and hence the valve element 96 have been raised after the pressure in the nozzle chamber 56 has been increased by the opening of the preliminary control valve 108.

FIG. 14 shows a preferred embodiment of the fuel pump 2 of the injection system according to the invention. The fuel pump 2 is constructed as a multiple radial piston pump and comprises a pump housing 128 in which a pump axle 130 of cylindrical exterior is fixed. Mounted rotatably on the pump axle is a cylinder star 132 which is driven at constant speed ratio by the internal-combustion engine by means of coupling dogs 134 only schematically indicated. A plurality of radially oriented pump cylinders 136 are constructed in the cylinder star 132 (see also FIG. 15), in which pump pistons 138 are slidably mounted, which are braced against the fuel pressure in the pump cylinders 136 against the cylindrical interior surface of a stroke ring 140. An eccentricity e exists between the axes of the stroke ring 140 and of the pump housing 128. The eccentricity e is equal to half the delivery stroke of each pump piston 138 and can be adjusted by means of an adjusting piston 142 which is arranged in the pump housing 128 slidably at right angles to the pump axle 130. Two pressure chambers 144 and 146 are constructed in the adjusting piston 142, between which a bracing piston 148 is present which is attached to the pump housing 128. During service the two pressure chambers 144 and 146 are charged with fuel, so that the adjusting piston 142 occupies a position determined by the equilibrium of the forces resulting from the pressures in the pressure chambers 144 and 146.

A bore 150 is made coaxially in the adjusting piston 142 and is open towards the bottom end (in FIG. 14) of the adjusting piston 142. The adjusting member of the fuel pump 2, which is constructed as a control slide valve 152, is housed slidably in the bore 150. Annular grooves are made in the bore 150 and in the control slide valve 152 so that a total of five annular chambers 154, 156, 158, 160 and 162 and two annular webs 164 and 166 are present on the control slide valve 152.

The total flow rate Q of the fuel delivered by the fuel pump 2 is conveyed by the pressure pipe 6 into the annular chamber 158. The annular chamber 158 is connected by an annular web 164 of specific throttle cross-section to the annular chamber 156 and further connected by an annular web 166 of specific throttle cross-section to the annular chamber 160. The magnitude of the two said throttle cross-sections is a function of the relative position between the adjusting piston 142 and the control slide valve 152. The annular chamber 156 is connected by a channel constructed in the adjusting piston 142 to the pressure chamber 144, so that the pressure prevailing in the annular chamber 156 is adjusted in the pressure chamber 144. The annular chamber 160 is connected by a further channel constructed in the adjusting piston 142 to the pressure chamber 146, so that the pressure prevailing in the annular chamber 160 is adjusted in the pressure chamber 146. The annular chamber 156 is further connected by a throttle cross-section, likewise determined by the annular web 164, to the annular chamber 154, which is connected to the section of the pressure pipe 6 leading to the collective pressure chamber 12. In similar manner the annular chamber 160 is connected by a throttle cross-section determined by the annular web 166 to the annular chamber 162, which is likewise connected to the section of the pressure pipe 6 leading to the collective pressure chamber 12. The total flow rate Q therefore travels through the adjusting mechanism of the fuel pump 2 along two separate paths: From the annular chamber 158 through the annular chamber 160 and the annular chamber 162 to the collective pressure chamber 12 and from the annular chamber 158 through the annular chamber 156 and the annular chamber 154 to the collective pressure chamber 12.

When the control slide valve 152 is slid relatively to the adjusting piston 142, the throttle cross-section between the annular chamber 158 and the annular chamber 156 on the one hand, and the throttle cross-section between the annular chamber 158 and the annular chamber 160 on the other hand, are modified in opposite directions. The throttle cross-sections between the annular chamber 156 and the annular chamber 154 on the one hand and the annular chamber 160 and the annular chamber 162 on the other hand are likewise modified in opposite directions. Irrespective of the relative position of the control slide valve 152 in the adjusting piston 142, the overall throttle effect between the annular chamber 158 and the collective pressure chamber 12 is constant. In a central position of the control slide valve 152, in which the throttle cross-sections from the annular chamber 158 to the annular chamber 160 and from the annular chamber 158 to the annular chamber 156 are equal and the throttle cross-sections from the annular chamber 160 to the annular chamber 162 and from the annular chamber 156 to the annular chamber 154 are equal, the pressures in the pressure chambers 144 and 146 of the adjusting piston 142 are equal, so that the latter assumes a stationary position and no adjustment of the eccentricity e of the stroke ring 140 occurs. In the case of positional deviation from this central position, pressure differentials appear in the pressure chambers 144 and 146, which lead to a resultant force at the adjusting piston 142 and hence to a displacement of the adjusting piston and hence in turn to a delivery stroke adjustment, until the symmetry of the relative position between control slide valve 152 and adjusting piston 142 is re-established. The adjusting piston 142 and the stroke ring 140 thus follow the position of the control slide valve 152, which can be moved without reactive forces from the fuel pressures acting upon it.

Figure 16:
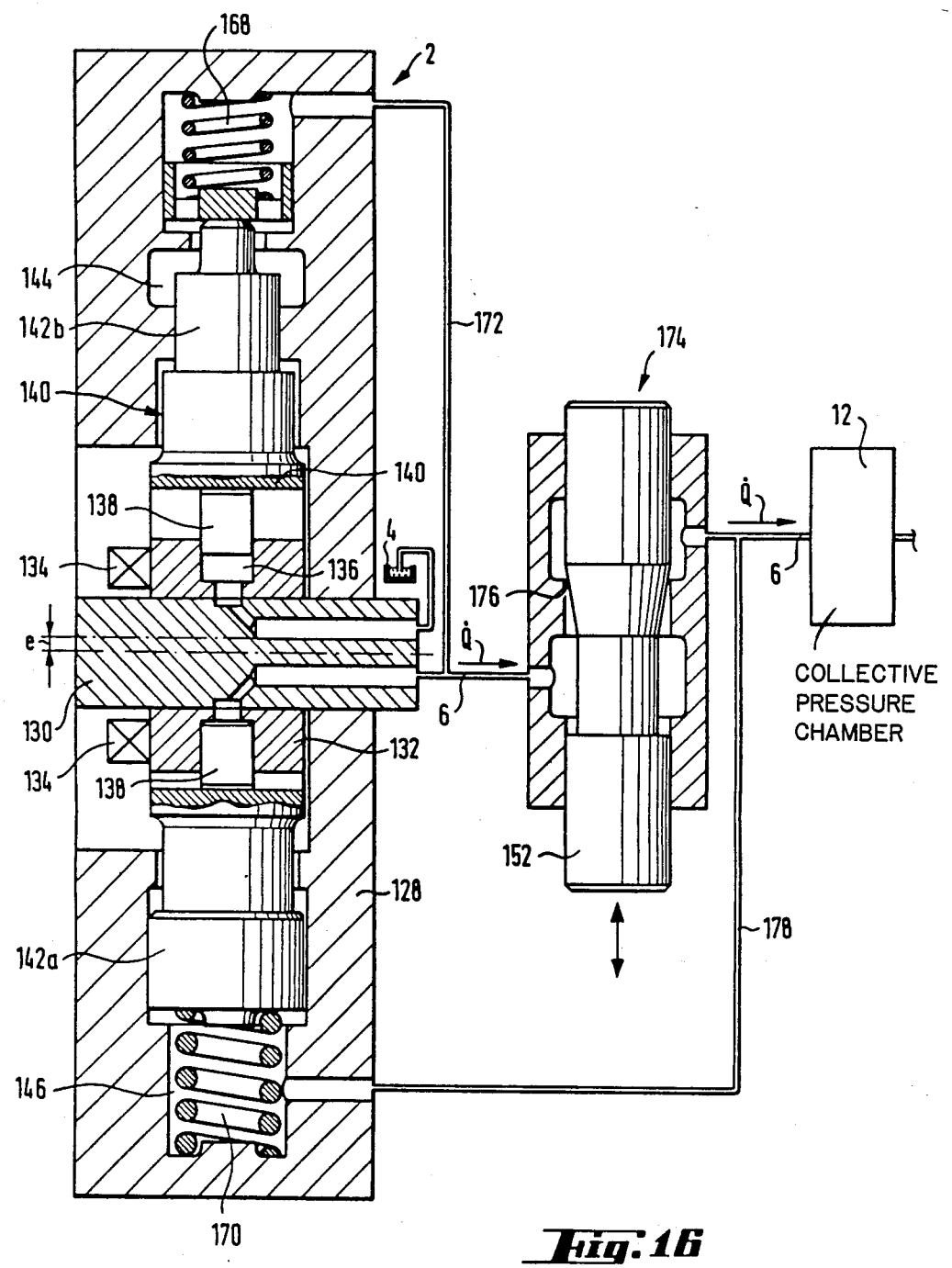
FIG. 16 shows a second exemplary embodiment of the fuel pump of the injection system.

FIG. 16 shows a further preferred embodiment of the fuel pump 2 of the injection system according to the invention, for which the same reference numerals are used for parts and elements which are identical to parts and elements of the exemplary embodiment according to FIG. 14; said parts and elements will not be explained afresh.

In the embodiment according to FIG. 16 the adjusting piston 142 is constituted by a lower adjusting piston section 142a which projects into the pressure chamber 146 constructed in the pump housing 128, and by an upper adjusting piston section 142b which projects into the pressure chamber 144 constructed in the pump housing 128. The two adjusting piston sections 142a and 142b are arranged mutually coaxially and connected to the stroke ring 140, so that the pressures prevailing in the pressure chambers 144 and 146 act upon the adjusting piston in opposite directions. A spring 168 acting upon the adjusting piston section 142b is arranged in the pressure chamber 144, and a spring 170 acting upon the adjusting piston section 142a is arranged in the pressure chamber 146.

The pressure chamber 144 is connected by a pipe 172 to the pressure pipe 6 downstream of the fuel pump 2. Downstream of the branch point of the pipe 172 there is arranged in the pressure pipe 6 a throttle valve 174 which exhibits a throttle cross-section 176 which can be modified by means of the adjusting member of the fuel pump 2, constructed as a control slide valve 152, so that a pressure differential exists between the pressures upstream and downstream of the throttle valve 174. Downstream of the throttle valve 174 a pipe 178 branches from the pressure pipe 6 and leads to the pressure chamber 146. The control slide valve 152 has such a form that the fuel pressures generate no resultant force upon it in its axial direction, so that the control slide valve 152 can be moved without reaction from the fuel forces.

The adjusting piston 142a, 142b assumes such a position that the forces acting upwards and downwards (in FIG. 16) upon it are in equilibrium. Because a variable pressure differential can be adjusted between the pressures in the pressure chambers 144 and 146 by means of the throttle valve 174, the adjusting piston 142 follows the position of the control slide valve 152.

Figure 17:
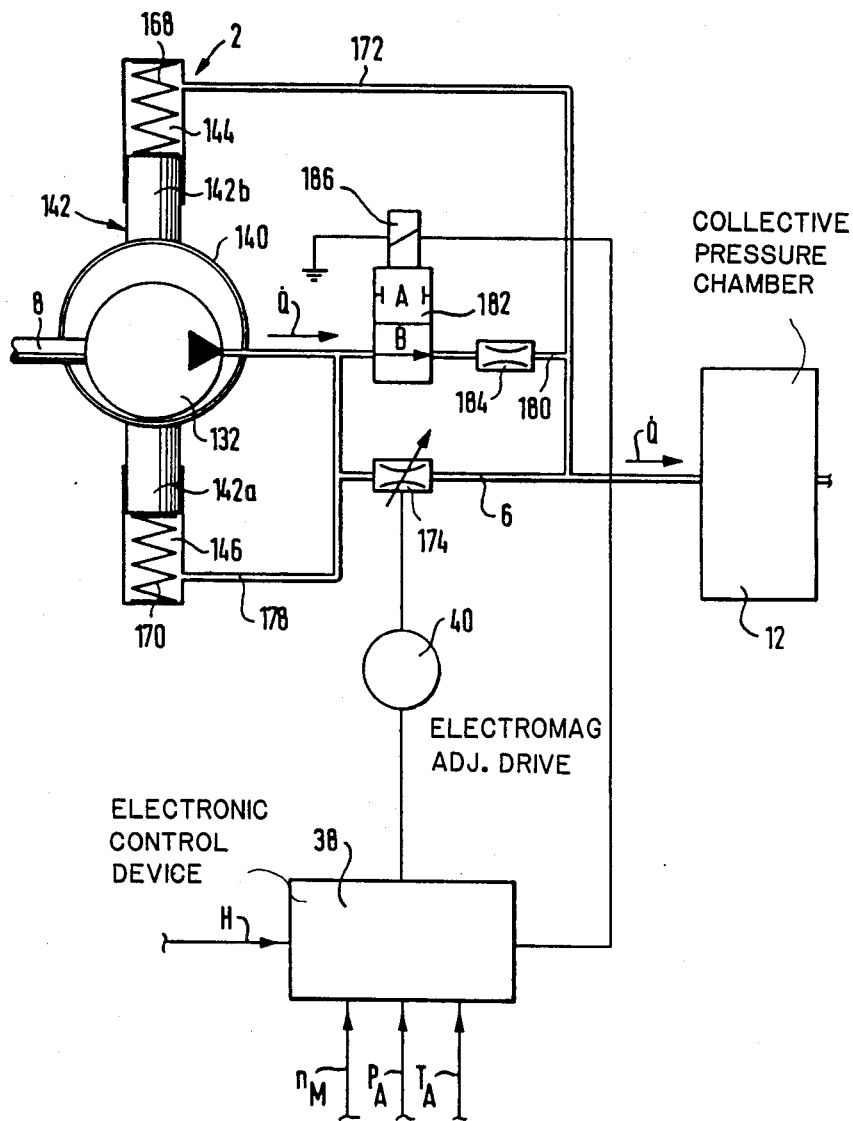
FIG. 17 shows a variant of the second exemplary embodiment according to FIG. 16.

FIG. 17 shows a variant of the exemplary embodiment illustrated in FIG. 16, in which parts and elements already explained are only schematically illustrated and not explained afresh.

A shut-off valve 182, and a fixed throttle cross-section 184 in series therewith, are arranged in a pipe branch 180 parallel to the throttle valve 174. The shut-off valve 182 is actuated by an electromagnetic adjusting drive 186. When the shut-off valve 182 is in its blocking position A, the pipe branch 180 is blocked so that the variant according to FIG. 17 operates in the same manner as the exemplary embodiment according to FIG. 16. However, when the shut-off valve 182 is in its open position B, the pipe branch 180 is open so that by adjusting the shut-off valve 182 abruptly the pressure differential between the pressure chambers 144 and 146 can be modified, which permits additional adjusting characteristics for the delivery stroke adjustment of the fuel pump 2.

FIG. 17 also illustrates the electromagnetic adjusting drive 40 which acts upon the throttle valve 174, and the electronic control device 38, which have already been explained with reference to FIG. 2.

I claim:

1. A fuel injection system for dosing and atomizing fuel into each cylinder of an internal-combustion engine, comprising:
   (a) an injection nozzle for each cylinder of the engine for atomizing the fuel into the respective cylinder;
   (b) a continuously-operating, controllable-flow-rate fuel pump for continuously pressurizing and dosing the fuel per unit of time from said fuel pump up to and through every injection nozzle for atomizing the fuel into the respective cylinder thereby delivering a quantity of the fuel required by the fuel injection system per said unit of time;
   (c) fuel path means for forming a fuel path and collective pressure chamber for the entire fuel flow from the fuel pump to every injection nozzle;
   (d) at least one timing means associated with each injection nozzle for opening, and controlling the timing of at least the opening of to each injection nozzle; and
   (e) means for setting the controllable flow rate of the fuel pump to the sum of the fuel quantities to be injected into every cylinder of the engine per unit of time such that a return flow of the fuel quantities into the fuel injection system is eliminated.

2. A fuel injection system in claim 1, wherein the fuel path means comprises a discrete collective pressure chamber.

3. A fuel injection system as in claim 1, wherein the adjusting drive means is also for closing and controlling the timing of the closing of the fuel path to each injection nozzle.

4. Fuel injection system according to claim 2, wherein each injection nozzle comprises an injection orifice for the fuel atomization into the respective cylinder, a nozzle chamber for providing the fuel to the injection orifice, a nozzle pipe for carrying the fuel from the discrete collective pressure chamber to the nozzle chamber, a displaceable nozzle needle extending through the nozzle chamber for opening and closing the injection orifice, and a nozzle spring which loads the nozzle needle in the closing direction and maintains it in its closed position counter to the highest fuel pressure in the nozzle chamber which occurs during service; and wherein the timing means comprises means for exerting upon the nozzle needle a force counteracting the nozzle spring, whereby the nozzle needle is displaced in the opening direction.

5. Fuel injection system according to claim 1, wherein each injection nozzle exhibits a nozzle chamber from which the injection orifice starts and which constitutes one end of the nozzle pipe, a displaceable nozzle needle extending through the nozzle chamber which can open and close the injection orifice, and a nozzle spring which loads the nozzle needle in the closing direction and permits a displacement of the nozzle needle in the opening direction when the fuel pressure in the nozzle chamber exceeds a specific value, characterised by a way-valve in each nozzle pipe which is opened by the modulated adjusting drive.

6. Fuel injection system according to claim 5, characterised in that the adjusting drive and the way-valve are structurally integrated with the injection nozzle housing.

7. Fuel injection system according to claim 1, wherein each injection nozzle exhibits a nozzle chamber from which the injection orifice starts and which constitutes one end of the nozzle pipe, a displaceable nozzle needle extending through the nozzle chamber which can open and close the injection orifice, and a nozzle spring which loads the nozzle needle in the closing direction and permits a displacement of the nozzle needle in the opening direction when the fuel pressure in the nozzle chamber exceeds a specific value, characterised by a hydraulically actuated shut-off valve in the nozzle pipe upstream of the nozzle chamber and a preliminary control valve actuated by the adjusting drive in a pipe branching from the nozzle pipe, whilst the modulated adjusting drive opens the preliminary control valve and thereby loads the shut-off valve with the fuel pressure in the opening direction.

8. Fuel injection system according to claim 7, characterised in that the pipe controlled by the preliminary control valve issues into the nozzle chamber and that the nozzle needle opens the shut-off valve upon its displacement in the opening direction.

9. Fuel injection system according to claim 8, characterised in that the nozzle needle and the valve element of the shut-off valve are integrally constructed.

10. Fuel injection system according to claim 2, wherein the fuel path means further comprises a flow throttle disposed downstream of the discrete collective pressure chamber and, downstream of the flow throttle, a nozzle accomulator from which the fuel passes to the injection nozzle for the atomization.

11. Fuel injection system according to claim 10, characterised in that an annular gap between the nozzle needle and its guideway in the injection nozzle housing constitutes the flow throttle.

12. Fuel injection system according to any one of claims 4 or 5 to 10, characterised in that, in parallel with the first arrangement comprising flow throttle and nozzle accumulator, in at least one bypass pipe, a second flow throttle, a second nozzle accumulator downstream of the second flow throttle and a second way-valve are connected to the nozzle pipe, whilst the way through the bypass pipe to the injection orifice can be opened at a different time from the way through the first arrangement.

13. Fuel injection system according to claim 12, characterised by a second adjusting drive to open the second way-valve.

14. Fuel injection system according to claim 12, with a first way-valve actuated by the first adjusting drive in the way through the first arrangement comprising flow throttle and nozzle accumulator, characterised in that the first way-valve and the second way-valve are actuated by the first adjusting drive, whilst the two way-valves open with a phase difference.

15. Fuel injection system according to claim 12, characterised in that the nozzle needle actuates the second way-valve and opens the injection orifice upon its displacement in the opening direction.

16. Fuel injection system according to claim 15, characterised in that the nozzle needle and the valve element of the second way-valve are integrally constructed.

17. Fuel injection system according to claim 1, wherein the means for setting the controllable flow rate of the fuel pump comprises means for driving the fuel pump by the internal-combustion engine proportionally to the speed of the latter and an adjusting member means for influencing the delivery stroke of the fuel pump as a control quantity function at least of the position of an accelerator for the internal-combustion engine.

18. Fuel injection system according to claim 4, 10, 17, 1 or 2 wherein the fuel pump is a piston pump with infinitely controllable delivery stroke of multiple-radial construction or multiple-axial construction.

19. Fuel injection system according to claim 17, wherein the control quantity is a function of the speed of the internal-combustion engine, ambient temperature, ambient pressure and cooling medium temperature.

20. Fuel injection system according to claim 17 or 19, characterised in that the fuel pump exhibits an adjusting piston slidable in the pump housing, by the position of which the delivery stroke of the fuel pump is determined and which is loaded with fuel pressures, and that the adjusting member is a slidable control slide valve which is arranged in the delivery stream in the pressure pipe of the fuel pump and at which the fuel pressures cancel each other, whilst the control slide valve adjusts the fuel pressures loading the adjusting piston by means of at least one variable throttle cross-section.

21. Fuel injection system according to claim 20, characterised in that the control slide valve upon its displacement adjusts oppositely two parallel located throttle cross-sections, and that the adjusting piston is moved by the effect of the pressure difference arising at the two cross-sections until equality of the two throttle cross-sections has been re-established.

22. Fuel injection system according to claim 20, characterised in that the control slide valve generates by means of a throttle cross-section a pressure difference which attacks the adjusting piston.

23. Fuel injection system according to claim 22, characterised in that the adjusting piston is attacked by a system of differently pretensioned springs with different spring constants.

24. Fuel injection system according to claim 22 or 23, characterised in that in parallel with the throttle cross-section adjustable by the control slide valve there are arranged one or more fixed throttle cross-sections whereby the fuel path can be blocked or cleared by electromagnetically controlled shut-off valves.

25. Fuel injection system according to claim 4, 10, 17, 1 or 2 wherein the adjusting drive means comprises an electromagnet with movable armature which is controlled by current impulses and a control device which generates the current impulses in correct phase as a function of the operating state of the internal-combustion engine.

26. Fuel injection system according to claim 25, characterised in that the control device generates the current impulses as a function of at least the speed of the internal-combustion engine and of its accelerator position.

27. Fuel injection system according to claim 25, characterised in that the control device also controls the duration of the current impulses as a function of the operating state of the internal-combustion engine.

* * * * *